(12) United States Patent
Mansfield

(10) Patent No.: US 7,177,293 B2
(45) Date of Patent: Feb. 13, 2007

(54) TERMINAL ASSISTED SCHEDULING FOR TIME COORDINATED CDMA

(75) Inventor: Carl Mansfield, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 1088 days.

(21) Appl. No.: 10/137,711

(22) Filed: Apr. 30, 2002

(65) Prior Publication Data

US 2003/0202485 A1 Oct. 30, 2003

(51) Int. Cl.
*H04B 7/216* (2006.01)
(52) U.S. Cl. .................... 370/335; 370/342
(58) Field of Classification Search ............. 370/329, 370/328, 335, 341, 342, 431, 441, 465
See application file for complete search history.

(56) References Cited

U.S. PATENT DOCUMENTS

| 5,568,483 A | * | 10/1996 | Padovani et al. ........... 370/468 |
| 5,734,967 A | * | 3/1998 | Kotzin et al. .............. 455/63.1 |
| 2002/0061006 A1 | * | 5/2002 | Soliman ..................... 370/342 |

* cited by examiner

*Primary Examiner*—Ajit Patel
(74) *Attorney, Agent, or Firm*—Lanny L. Parker

(57) ABSTRACT

A telecommunications system supports a variety of packet data services with throughputs ranging from low to high data rates. The system controls the user data transmission over a channel according to the user data throughput requirements of the application. By properly scheduling the time that particular transmission takes place, high data rate applications may be supported without the need for code aggregation, and low rate users may be supported without the requirement of multiple spreading factors. Base stations may transmit scheduling information to user devices in downlink time slots and user devices may transmit status information to base stations in uplink time slots.

18 Claims, 4 Drawing Sheets

Fig. 2

| User | Sample Allocation Scenario | | | |
|---|---|---|---|---|
| | Scenario 1 | Scenario 2 | Scenario 3 | Scenario 4 |
| 1 | 15 kbps | 15 kbps | 51.2 kbps | 256 kbps |
| 2 | 15 kbps | 15 kbps | 51.2 kbps | 256 kbps |
| 3 | 128 kbps | 50 kbps | 51.2 kbps | 256 kbps |
| 4 | 128 kbps | 50 kbps | 51.2 kbps | |
| 5 | 15 kbps | 50 kbps | 51.2 kbps | |
| 6 | 15 kbps | 50 kbps | 51.2 kbps | |
| 7 | 128 kbps | 15 kbps | 51.2 kbps | |
| 8 | 64 kbps | 50 kbps | 51.2 kbps | |
| 9 | 64 kbps | 77 kbps | 51.2 kbps | |
| 10 | 6 kbps | 129 kbps | 51.2 kbps | |
| 11 | 150 kbps | 67 kbps | 51.2 kbps | |
| 12 | 1 kbps | 47 kbps | 51.2 kbps | |
| 13 | 39 kbps | 53 kbps | 51.2 kbps | |
| 14 | | 45 kbps | 51.2 kbps | |
| 15 | | 55 kbps | 51.2 kbps | |
| Total | 768 kbps | 768 kbps | 768 kbps | 768 kbps |

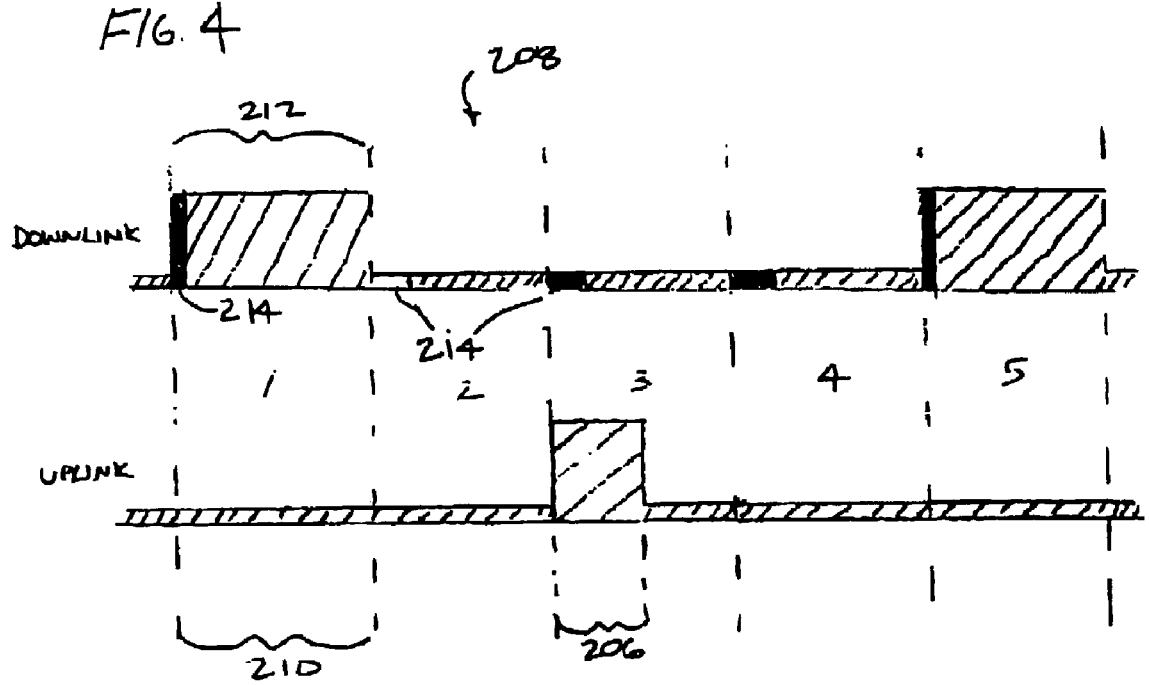
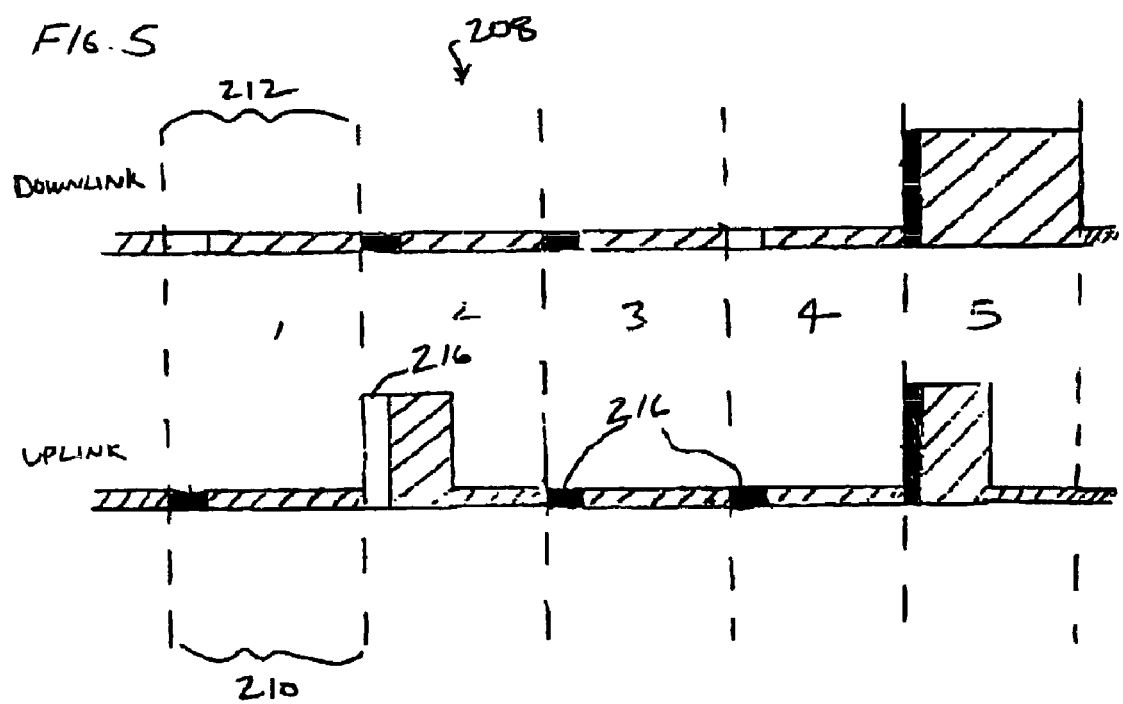

TERMINAL ASSISTED SCHEDULING FOR TIME COORDINATED CDMA

Presently, Code-Division-Multiple-Access (CDMA) communication, which is a type of radio communication using a spread spectrum technique, is widely used in mobile communication systems. A transmitter modulates data with a spreading code sequence into spread data, which is then transmitted over a Radio Frequency (RF) link. In order to recover the data, the receiver must de-spread the spread data by using the same spreading code sequence as used by the transmitter. Wideband Code-Division-Multiple-Access (W-CDMA) is a digital wireless communications technology that is based on the concepts of traditional or narrowband CDMA technology, where information is encoded, and spread across a broad radio frequency spectrum prior to transmission. W-CDMA uses a broader frequency spectrum channel (typically 5 MHz, and potentially up to 20 MHz) than the narrowband CDMA, and acts as a high-capacity wideband channel to enable higher data-rate transmissions for mobile communications.

Third-generation mobile systems, such as UMTS and IMT-2000, may use W-CDMA radio technologies. While such W-CDMA systems may be well suited for multimedia systems in which isochronous services are a key feature, they may not be ideal for packet data systems in which a wide range of applications with differing throughput and burstiness characteristics are to be supported. With respect to narrowband CDMA, each CDMA channel provides a low, basic unit of data throughput, e.g., 8 kbps. Higher data rates may be achieved by providing code-aggregation in which a single user operates multiple parallel CDMA channels (e.g., IS-95). This approach is highly cost inefficient, since the user devices support multiple baseband receivers, one for each aggregated channel. Since costs are generally more critical in subscriber devices, this method may not be economically viable.

The W-CDMA system is designed to support multiple spreading rates. User devices that demand high data throughputs are assigned low spreading rates, while user devices that demand lower data throughputs are assigned high spreading rates. The problem with this approach is the complexity introduced in managing codes, varying spreading rates and the like. In addition, such systems may suffer from efficiency problems due to the quantization of the available throughputs determined by the available spreading rates, which may also require complex rate matching procedures. The overhead bits required in the data stream become much more significant as the spreading rate is increased. This results in very low efficiency for lower rate services that use lower spreading rates.

Therefore, it would be advantageous to provide an integrated, flexible system that supports multiple data rate transfer parameters, e.g., in CDMA wireless systems that support both packet data and voice in a variety of multimedia applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a table illustrating four scenarios in which different combinations and numbers of user devices are supported by each base station in the wireless communications system of FIG. 1;

FIG. 4 is an illustrative diagram of the transmission of scheduling information from a base station to a user device in the wireless communications system of FIG. 1; and FIG. 5 is an illustrative diagram of the transmission of status information from a user device to a base station in the wireless communications system of FIG. 1.

Figure 1:
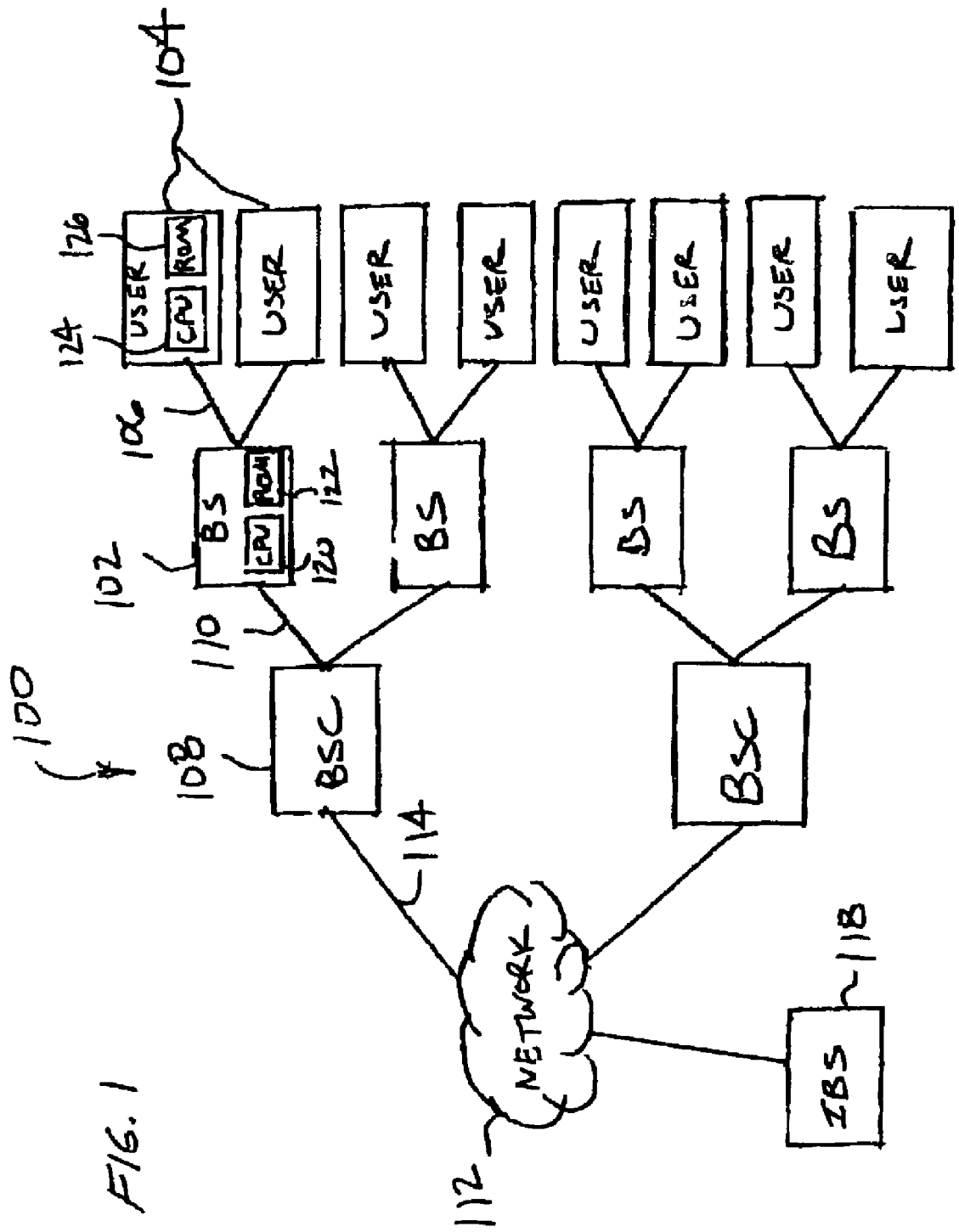
FIG. 1 is a block diagram showing an embodiment of a wireless communications system.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Referring to FIG. 1, a preferred embodiment of a wireless communication system 100 may support both switched circuit message transmissions and packet data message transmissions to a subscriber of system 100, and may support a variety of applications, such as, e.g., packet data, voice, fax, security, network management, subscriber management, and billing communications. System 100 comprises a plurality of base stations (BS) 102 for communicating with terminals or user devices 104 via Code Division Multiple Access (CDMA) channels 106. A low data rate link, and thus communication, may be maintained between user device 104 and base station 102 regardless of whether data is flowing through CDMA channels 106.

Each base station 102 includes processing circuitry 120, such as, e.g., a Central Processor Unit (CPU), and an associated storage medium 122 such as a Read Only Memory (ROM). Likewise, each user device 104 includes processing circuitry 124 such as, e.g., a Central Processor Unit (CPU), and an associated storage medium 126, such as, e.g., ROM. ROM's 122 and 126 typically contain computer software that includes instructions, which when executed by the respective CPU's 120 and 124, implement the functions of base stations 102 and user devices 104.

Base station 102 may be coupled to a Base Station Controller 108 (BSC) by any of a variety of wired connections 110 including, for example, Local Area Data Access (LADA) lines, T1 or fractional T1 lines, Integrated Services Digital Network (ISDN) Basic Rate Interface (BRI), cable TV lines, fiber optic cable, digital radio, microwave links, or private lines. Base station controller 108 may be connected to one or more networks 112, such as, e.g., a Public Switched Telephone Network (PSTN), Internet or X.25 network, via any variety of network links 114, which may include the same basic categories of transport means as the wired connections 110. System 100 may also include an "intelligent" base station (IBS) 118, which is connected directly to the network(s) 112 without the interface of a base station controller 108. Such IBS platforms effectively incorporate the BSC and BS functions into a single platform.

In operation, base stations 102 format and send digital information to base station controller 108 (or directly to the network(s) 112 in the case of an intelligent base station 118). Base station controllers 108 control the multiple base stations 102, assist in handoffs between base stations 102, and convert and format channel information and signaling information for delivery to the network(s) 112. Intelligent base stations 118 may use ISDN messaging for registration, call delivery and handoff over a public telephone switch. It should be noted that although the following methodologies are described as being performed in base stations 102, these methodologies may be performed in base station controllers 108 as well. For the purposes of this specification, a base station may be considered as any unit that directly or indirectly controls user devices 104, such as, e.g., base station 102, base station controller 108 or IBS 118.

Under control of each base station 102, user devices 104 are scheduled to transmit at a full CDMA channel data rate, e.g., 256 kbps, only during certain periods based on the user data throughput requirements of the particular user devices 104. For example, if a particular user device 104 is using a service or application requiring a relatively high data throughput, e.g., 128 kbps, the base station 102 may define a relatively large transmission duty cycle, e.g., 50%, for the user device 104. Thus, although user device 104 may be transmitting at the full CDMA channel data rate of 256 kbps, it is only transmitting 50% of the time, thereby providing an average data transmission rate for user device 104 of 128 kbps.

In contrast, if a particular user device 104 is using a service or application requiring a relatively low data throughput, e.g., 25.6 kbps, then base station 102 may define a relatively small transmission duty cycle, e.g., 10%, for user device 104. Thus, although user device 104 may be transmitting at the full CDMA channel data rate of 256 kbps, it is only transmitting 10% of the time, thereby providing an average data transmission rate for the user device 104 of 25.6 kbps. It can thus be seen that in the illustrated embodiment, the defined transmission duty cycle for each of user devices 104 is directly proportional to the user data throughput requirement of user devices 104. It should be noted that transmission scheduling may also be based on other characteristics of the user data to be transmitted, e.g., a priority class indicating the criticality of the prompt transmission of data, in which case, the defined transmission duty cycle for each of user devices 104 may not necessarily be proportional to the user data throughput requirement of user devices 104 if the priority classes of the data to be transmitted differ.

Base stations 102 control the transmission scheduling of user devices 104 in such a way that the number of active channels at any given time does not exceed the soft-capacity limit of system 100. Specifically, for each base station 102, a data transmission rate capacity for the CDMA channels 106 is defined and divided up according to the user data throughput requirements of user devices 104.

FIG. 2 illustrates this concept by setting forth four possible resource allocation scenarios. For ease in describing the operation of system 100, some assumptions are made both for simplification and to more clearly illustrate key features and performance characteristics. Specifically, the characteristics of mobile multimedia services may differ from telephony in that the demand over time varies in its requests for speed of transfer, length of transmission streams and the symmetry of bi-directional transmissions. In order to adopt multimedia applications efficiently and to save spectrum resources, both circuit and packet switched radio access modes should be supported. Any traffic calculations, as described herein, consider both transmission principles. Further, it is even assumed that asymmetric traffic distributions may influence the spectrum demand on the uplink and downlink.

Base station 102 may support sixteen CDMA channelization codes, with each code having a spreading rate of sixteen. Therefore, assuming that one code is reserved for a control channel, fifteen codes are available to support fifteen potential channels, and thus, fifteen user devices 104. Also, it is assumed that the basic data rate of a CDMA channelization code at 100% utilization is 256 kbps. In other words, the maximum data rate per channel is assumed to be 256 kbps. An additional assumption is that the user data transmission rate capacity for each base station 102 is 768 kbps. Thus, system 100 may not have more than three user devices 104 transmitting at one time (assuming a full CDMA channel data rate of 256 kbps for CDMA channel 106) for each base station 102. It is expected that one skilled in the art can design a system 100 based on the disclosure to have a different number channelization codes, a different full CDMA channel data rate, or a different data transmission rate capacity, and may easily scale system 100 based on these differences.

As the scenarios indicate, the user data transmission rate capacity may be divided up according to the user data throughput requirements of user devices 104 in a highly flexible and non-quantized manner, provided the total data throughput of user devices 104 is less than the user data transmission rate capacity of the associated base station 102, or 768 kbps. The different data throughput requirements for user devices 104 are indicative of the type of application being used by a user device 104. For example, the 15 kbps data throughput requirement may indicate a compressed voice application and the 128 kbps data throughput requirement may indicate access to the Internet. A key point is that the user data transmission rate capacity for each base station 102 may be efficiently divided up according to the needs of user devices 104, therefore effectively providing support for diverse multimedia applications. For example, three user devices 104, each at the maximum data rate of 256 kbps, may be supported, as in Scenario 4, or a wide range of user devices 104 at varying data rates may be supported, as in Scenario 1, where the user data throughput requirements may vary from 1 kbps to 150 kbps over different channels. It is noted that if the amount codes utilized runs out, the full potential capacity of the system cannot be used (i.e., 768 kbps is not fully utilized).

It is noted that if the user data throughput requirements for user devices 104 are less than 51.2 kbps, base station 102 would run out of codes before the full 768 kbps transmission capacity is fully used, assuming the number of channelization codes available in the illustrated system 100 is fifteen. This does not prevent system 100 from supporting lower data throughputs than 51.2 kbps, as some of the scenarios in FIG. 2 show. Rather, the scenarios indicate that the available user data throughputs may be much lower or much higher than 51.2 kbps. Since system 100, however, is targeted as a high-speed wireless packet data service, the concern that the user data throughput for each user 102 may be less than 51.2 kbps is thought to be minor and a typical. In other words, as multimedia applications require faster user data throughputs, it is believed that any limitation of channelization codes will not be significant. In any event, the number of channelization codes in a particular system may be designed to be higher. Moreover, spreading rates or time sharing of codes may be added to allow better utilization of the available transmission capacity if the average user rate is less than 51.2 kbps.

Figure 3:
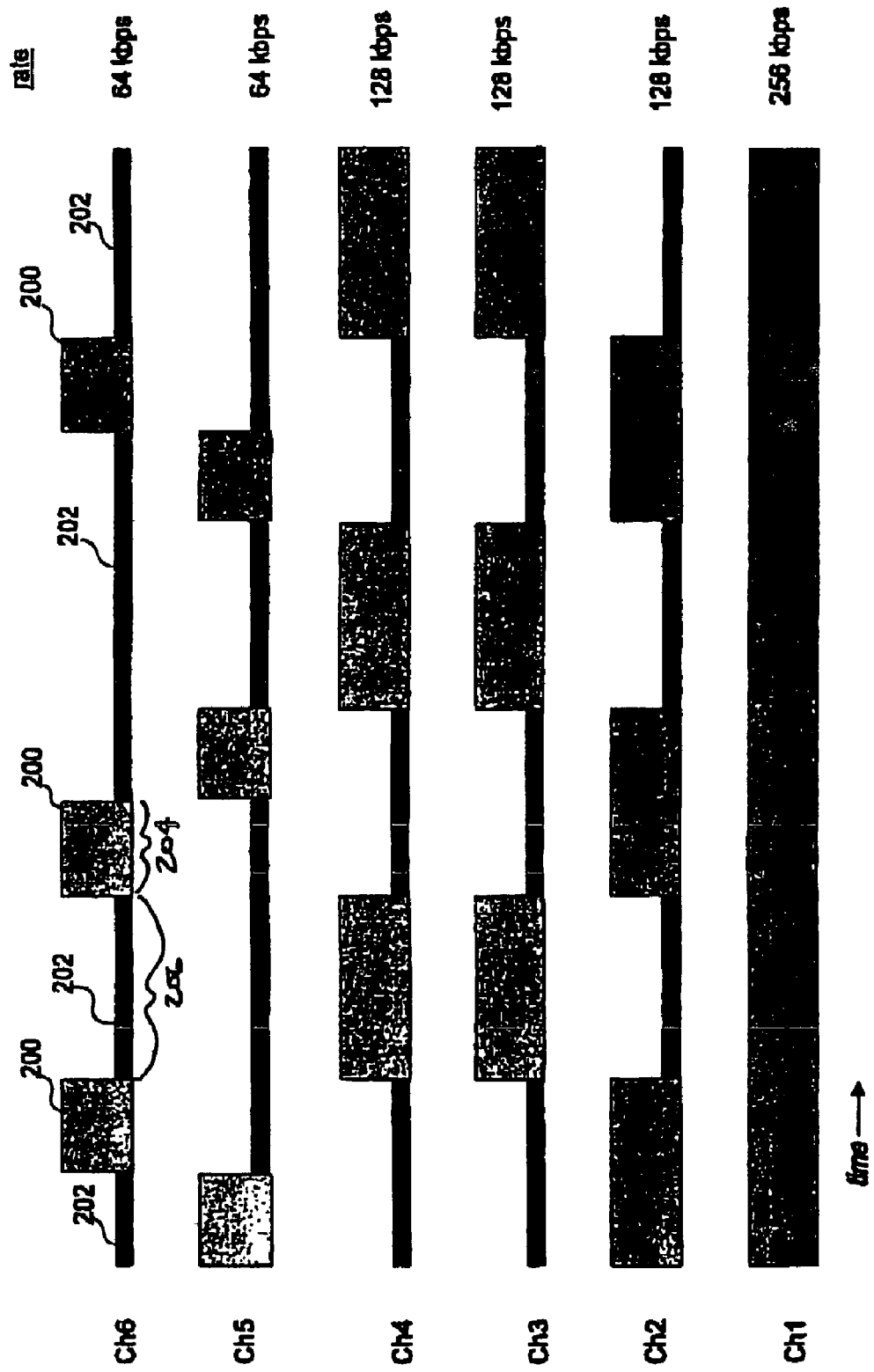
FIG. 3 is an illustrative diagram of a time coordinated user device transmission methodology performed in the wireless communications system of FIG. 1.

Coordination of the use of the possible fifteen allocated CDMA channels 106 is preferably accomplished to ensure that a maximum of only three codes are in use at one time (as the soft capacity limit). FIG. 3 illustrates this time-coordinated scheduling concept. In FIG. 3, it is assumed that six channels are active, one providing an average data transmission rate of 256 kbps to an associated user device 104, three providing an average data transmission rate 128 kbps data to their associated user devices 104, and the final two providing an average data transmission rate of 64 kbps to their associated user devices 104. The depiction in FIG. 3 is for illustrative purposes for various scenarios, and different numbers of active channels may also be used, as well as different full CDMA channel data rates for each channel.

The FIG. 3 illustration shows that time periods 204 during which user devices 104 transmit user data, and time periods 206 during which user devices 104 do not transmit user data or are quiet, are scheduled, such that at any given time only three channels are actively transmitting user data 200, while the others are simply transmitting low rate link maintenance data 202. Thus, at least for those user devices 104 that have data throughput requirements that are less than their full CDMA channel data rate (all channels except for channel 1), user devices 104 have average data transmission rates that are less than their full CDMA channel data rate, and preferably equal to or greater than their respective user data throughput requirements. Consequently, system 100 may be capable of supporting a wide range of user data throughputs without exceeding the soft capacity threshold and without the need to provide support for code aggregation or multiple spreading rates. It is noted that, in the illustrated embodiment, the transmission time periods 204 are not necessarily uniform and periodic (as illustrated by channels 2–4), but may be non-uniform or non-periodic (as illustrated by channels 5 and 6). A key aspect is that base station 102 schedules the user data transmissions of user devices 104 in a manner that utilizes the resources of system 100 efficiently. This scheduling is dynamic and may be performed on a real-time or near real-time basis.

Referring to FIGS. 4 and 5, data may be transmitted between base station 102 and user device 104 over a CDMA channel 106 in regular frames/time slots 208, which are divided into uplink time slots 210 and downlink time slots 212. User device 104 transmits on uplink time slots 210, and base station 102 transmits on downlink time slots 212. In the illustrated embodiment, time slots 208 are based on a physical layer slot/frame structure or a Radio Link Control (RLC) protocol frame structure of the W-CDMA system. The bi-directional nature of CDMA channels 106 are used to provide bilateral control communication between base station 102 and a particular user device 104. That is, information is transmitted over a CDMA channel 106, but may, part of the time, be transmitting low rate maintenance information rather than high rate data at a higher power. Consequently, there may be a regular uplink and downlink stream associated with each user device 104 for link maintenance purposes (power control, synchronization, etc.).

It is noted that time periods 206 during which the user data is transmitted are synchronized with time slots 208, such that the user data is always transmitted between the beginning and end of a time slot 208. For purposes of simplicity, the scheduling of the uplink data transmissions will be discussed below in terms of time slots 208, rather than time periods 206. It should be understood, however, that time periods 206 are different from time slots 208 in that time periods 206 mark the actual beginning and end of an uplink user data transmission, whereas time slots 208 mark the beginning and end of a time segment between which uplink data may be transmitted.

Referring specifically to FIG. 4, base station 102 informs user device 104 whether it is permitted to transmit in the next uplink time slot 210, e.g., by transmitting the uplink transmission schedule (represented by scheduling bits 214) to user device 104 at the beginning of each time slot 208. As illustrated, the scheduling bits 214 may be transmitted as part of the user data (as shown in FIG. 4, time slots 1 and 5) or as part of the low data rate maintenance link (as shown in FIG. 4, time slots 2–4). For purposes of illustration, the scheduling bits 214 that indicate that the user device 104 is not permitted to transmit during the next uplink time slot 210 are dark, and the scheduling bits 214 that indicate that the user device 104 is permitted to transmit during the next uplink time slot 210 are light. Thus, as can be seen, user device 104 transmits user data in the uplink time slot 3 only after the base station 102 transmits scheduling bits 214 in the downlink time slot 2 indicating that user device 104 is permitted to transmit during the next uplink time slot 210. Base station 102 is thus able to readily control the Quality of Service (QoS) offered to each user device 104 according to the user data throughput requirements of user device 104. Scheduling for downlink transmissions is trivial since base station 102 simply transmits according to its predetermined schedule.

Referring specifically to FIG. 5, user device 104 informs base station 102 whether it has data to transmit in an uplink time slot 210, e.g., by transmitting status information (represented by status bits 216) to base station 102 at the beginning of each uplink time slot 210. The configuration of the status information and the number of status bits 216 needed to carry the status information may be implemented in a number of ways. For example, the status information may be represented by a single status bit used to indicate to base station 102 that user device 104 either has user data to transmit or does not have user data to transmit. Alternatively, two or more status bits may be used to provide base station 102 with an indication of the amount of user data queued at user device 104. In a further alternative embodiment, two or more status bits may be used to indicate to base station 102 whether user device 104 has data ready to send and the QoS priority class of the user data waiting to be transmitted.

The status information may be used by base station 102 to determine how the uplink transmission scheduling of user device 104 should be achieved. Hence, the scheduling is "Terminal Assisted". A key point is that base station 102 may avoid scheduling an uplink resource to a user device 104 that does not have user data to transmit. As illustrated in FIG. 5, status bits 216 may be transmitted as part of the user data (time slots 2 and 5) or as part of the low data rate maintenance link (time slots 1, 3, and 4). For purposes of illustration, status bits 216 that indicate that user device 104 has user data to transmit are dark, and scheduling bits 216 that indicate that user device 104 does not have user data to transmit during are light. Thus, as can be seen, sometime after user device 104 transmits status data 216 indicating that it has user data to transmit in uplink time slot 3, base station 102 transmits scheduling bits 214 (in this case, downlink time slot 4) indicating that user device 104 is permitted to transmit during the next uplink time slot 210 (in this case, uplink time slot 5). It should be noted that time delays associated with the necessary "loop-around" may be reduced by, for example, providing status information per uplink time slot 210, while the scheduling information might be provided per four downlink time slots 212.

Prior to the start of data transmission, user device 104 and base station 102 or other devices within the infrastructure, negotiate the specific transmission parameters (such as, the data throughput, burstiness, priority, and delay) that may be used during transmission. This negotiation may be performed on a fixed per subscription basis or done every time user device 104 starts a new session for data transfer. User device 104 and base station 102 may then attempt to match the resource scheduling and match the transmission parameters that were agreed upon in the negotiation. For example, a user might turn on the user device 104 and start a web browsing session. For this session, the user desires an aggregate throughput of 200 kbps, but is not concerned with the delay, etc. User device 104 may then negotiate with base station 102 to obtain this data rate, and then base station 102 schedules data transmissions to provide the agreed upon data rate.

Alternatively, each base station 102 may also determine the user data throughput requirement of each user device 104 by identifying the application used by user device 104. For example, a short bit stream or preamble code (not shown) that is unique to or identifies a particular application may be transmitted. In response, base stations 102 may allocate an associated average data transmission rate to user device 104. Alternatively, an application may result in the transmitted user data itself having certain features that may identify the application. Base station 102 optionally correlates or recognizes the characteristics, and thereby identifies the corresponding application. In another example, user device 104 may be associated with a particular application, so that when user device 104 attempts to communicate, base station 102 may recognize the fixed application for a particular user device 104 and, in response, allocate an associated average data transmission rate to user device 104. Alternatively, user device 104 may change applications and base station 102 could recognize when user device 104 changed applications, and thereby appropriately allocate an associated average data transmission rate. In all the examples, a significant point is that base station 102 may recognize the type of application a user device 104 desires to use from a data stream, subscriber identification feature, preamble or one of various other features, and in response, associate a particular data throughput. Base station 102 may also allocate average data transmission rates by considering the applications used by other user device 104 and reprioritize data throughputs accordingly.

System 100 may handle various levels of throughput on a CDMA channel 106, supporting high data throughput applications without the need for code aggregation. Also, low data throughput user devices 104 may be supported under the control of base station 102. By allowing user device 104 to transmit according to a schedule as provided by system 100, low data throughput user devices 104 may be accommodated. In such an approach, the need for the support of multiple spreading rates, and their associated problems is obviated, because user devices 104 that have common system requirements may be directed to share a common channel. Prior systems that require multiple spreading rates or code aggregation may offer only certain aggregate rates to user device 104, resulting in wastage of airlink resources. The disclosed approach considers that the available resources may be utilized at maximum efficiency since there is no artificial quantization of the data rates that are provided to user device 104. In effect, average data rates up to the maximum rate of the CDMA channel 106 may be achieved and provided. Base station 102 is therefore able to readily control the QoS offered to each user device 104 according to its data throughput requirement. Additionally, base station 102 may maximize the efficient use of the available uplink resource since it may be provided with information regarding the status of user devices 104 on a regular basis. The information provided to base station 102 by all of the active user devices 104 allows base station 102 to more accurately control and maximize the overall QoS of system 100.

It should be noted that scheduling of downlink transmissions from base station 102 to user devices 104 is the same as the scheduling of uplink transmissions from user devices 104 to base station 102. That is, the duty cycle process for the uplink and downlink transmissions between any particular user device 104 and base station 102 is the same. Thus, the whole process of scheduling on different CDMA channels (i.e., codes), such that there is only one spreading rate and that the "soft capacity" at any given time is the same for both uplink and downlink transmissions. The difference between the scheduling of the uplink and downlink transmissions arises in the signaling of the scheduling information. Since all downlink transmissions occur from a single point (i.e., base station 102), base station 102 may easily schedule its use of codes and duty cycles of downlink transmissions to every user device 104. Therefore, there is no need for the transmission of explicit scheduling information to these user devices 104. Conversely, in the uplink direction, each user device 104 has no knowledge of other user devices 104 that are not co-located. Therefore, some controlling entity, such as base station 102 informs user devices 104 when they may transmit. Effectively, the scheduling of the downlink transmissions is implicit in the actual transmissions from base station 102.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications and equivalents, which may be included within the spirit and scope of the present inventions as defined by the claims.

The invention claimed is:

1. A method for communicating between a base station and user devices, comprising: defining a transmission duty cycle for the user devices based on data throughput requirements for the user devices; transmitting status data from the user devices to the base station indicating whether the user devices have data to transmit; transmitting scheduling data from the base station to the user devices, the scheduling data being based on the defined transmission duty cycle and the status data of the user devices; and transmitting data from the user devices to the base station over a plurality of Code Division Multiple Access (CDMA) channels in accordance with the scheduling data, wherein the transmission duty cycle of one user device is equal to a quotient of the user data throughput requirement of the one user device divided by a full CDMA channel data rate of the one user device.

2. The method of claim 1, further comprising defining a user data transmission rate capacity for the plurality of CDMA channels, wherein the scheduling data is based on the user data transmission rate capacity.

3. The method of claim 1, further comprising transmission relatively low data rate link maintenance information between the user device and the base station when transmission of the user data is not scheduled, wherein the low data rate link maintenance information comprises the status data and the scheduling data.

4. The method of claim 1, wherein the base station is configured for defining a plurality of time slot that are divided into uplink time slots and downlink time slots, the status data is transmitted within the uplink time slots and the scheduling data is transmitted within the downlink time slots.

5. A communications system, comprising: a plurality of user devices having a plurality of user data throughput requirements, each of the plurality of user devices being configured to transmit status data indicating whether the each user device has data to transmit; a base station configured for defining a transmission duty cycle for the each user device based on the user data throughput requirement of the each user device, the base station being further configured for receiving the status data and transmitting scheduling data to the each user device based on the defined transmission duty cycle and the status data of the each user device; and a plurality of Code Division Multiple Access (CDMA) channels between the base station and the plurality of user devices, wherein the plurality of user devices is configured for transmitting user data to the base station over the plurality of CDMA channels in accordance with the scheduling data, wherein the transmission duty cycle of the each user device is equal to a quotient of the user data throughput requirement of the each user device divided by a full CDMA channel data rate of the each user device.

6. The communications system of claim 5, wherein the base station is configured for further defining a user data transmission rate capacity for the plurality of CDMA channels, wherein the scheduling data is based on the user data transmission rate capacity.

7. The communications system of claim 5, wherein the base station is configured for further defining a plurality of time slots, and the plurality of user device is configured for transmitting the user data within the plurality of time slots.

8. The communications system of claim 7, wherein the plurality of time slots is divided into uplink time slots, the plurality of user device is configured for transmitting the status data within the uplink time slots, and the base station is configured for transmitting the scheduling data within the downlink time slots.

9. The communications system of claim 5, wherein each of the plurality of CDMA channels comprises a relatively low data rate maintenance link, the plurality of user device is configured for transmitting the status data on the relatively low data rate maintenance link, and the base station is configured for transmitting the scheduling data on the relatively low data rate maintenance link.

10. The communications system of claim 5, wherein the plurality of user device is configured for transmitting the status data along with the user data transmitting from the user devices, and the base station is configured for transmitting the scheduling data along with user data transmitted from the base station.

11. A method for time coordinating communication between a base station and two or more user devices having a plurality of user data throughput requirements, comprising: defining a transmission duty cycle for the two or more user devices based on the user data throughput requirement of the each user device; and transmitting user data from the two or more user devices to the base station over a plurality of Code Division Multiple Access (CDMA) channels in accordance with the transmission duty cycles, wherein the transmission duty cycle of the each user device is equal to the quotient of the user data throughput requirement of the each user device divided by the full CDMA channel data rate of the each user device.

12. The method of claim 11, wherein the two or more user device have substantially different throughput requirements and the transmission duty cycles of the two or more user devices are substantially different.

13. The method of claim 11, wherein the transmission duty cycles of the each user device is directly proportional to the user data throughput requirement of the each user device.

14. The method of claim 11, further comprising:
defining a user data transmission rate capacity for the plurality of CDMA channels; and
limiting a total throughput of the two or more user devices to the user data transmission rate capacity.

15. A communications system, comprising: a plurality of user devices having a plurality of user data throughput requirements; a base station configured for defining a transmission duty cycle for each of the plurality of user devices based on the user data throughput requirement of the each user device; and a plurality of Code Division Multiple Access (CDMA) channels between the base station and the plurality of user devices, wherein the transmission duty cycle of the each user device is equal to the quotient of the user data throughput requirement of the each user device divided by the full CDMA channel data rate of the each user device.

16. The communications system of claim 15, wherein two or more of the plurality of user device have substantially different throughput requirements, and the transmission duty cycle of the two or more user device are substantially different.

17. The communications system of claim 15, wherein the transmission duty cycle of the each user device is directly proportional to the user data throughput requirement of the each user device.

18. The communications system of claim 15, wherein the plurality of CDMA channels has a defined user data transmission rate capacity, and the base station is configured for limiting a total throughput of the plurality of the user devices to the user data transmission rate capacity.

* * * * *